United States Patent [19]

Whitehead

[11] 4,413,366
[45] Nov. 8, 1983

[54] BED FRAME

[75] Inventor: Larry W. Whitehead, Lexington, N.C.

[73] Assignee: Leggett & Platt, Incorporated, Carthage, Mo.

[21] Appl. No.: 266,717

[22] Filed: May 26, 1981

[51] Int. Cl.³ .......................................... A47C 19/00
[52] U.S. Cl. ......................................... 5/201; 5/285; 5/296; 403/254; 403/316
[58] Field of Search ............... 5/282 R, 285, 288–299, 5/200 C, 201, 200 D; 403/316, 253, 254; 292/106

[56] References Cited

U.S. PATENT DOCUMENTS

| 106,382 | 8/1870 | Fraley | 5/299 |
| 460,034 | 9/1891 | Robbins . | |
| 653,158 | 7/1900 | Walker . | |
| 792,326 | 6/1905 | Floare . | |
| 812,879 | 2/1906 | Rice | 292/106 |
| 1,518,970 | 12/1924 | Dyke . | |
| 2,713,505 | 7/1955 | Luger | 292/106 |
| 3,046,043 | 7/1962 | Matteson | 292/337 |
| 3,961,381 | 6/1976 | Weinhart et al. | 5/296 |

Primary Examiner—Alexander Grosz
Assistant Examiner—Michael F. Trettel
Attorney, Agent, or Firm—Wood, Herron & Evans

[57] ABSTRACT

A bed frame comprising a headboard, footboard, and a pair of side rails interconnecting the headboard and footboard. The side rails each include a pair of hooks on the end of the rails insertable into vertical slots in the legs of the headboard and footboard. These hooks are engageable with transverse pins which extend across the slots. A longitudinally slideable latch is mounted on the end of each rail and is cooperable with one of the hooks on the end of each rail to lock the rails to the headboard and footboard such that the rails may not be inadvertently dislodged or disengaged from the headboard or footboard.

3 Claims, 4 Drawing Figures

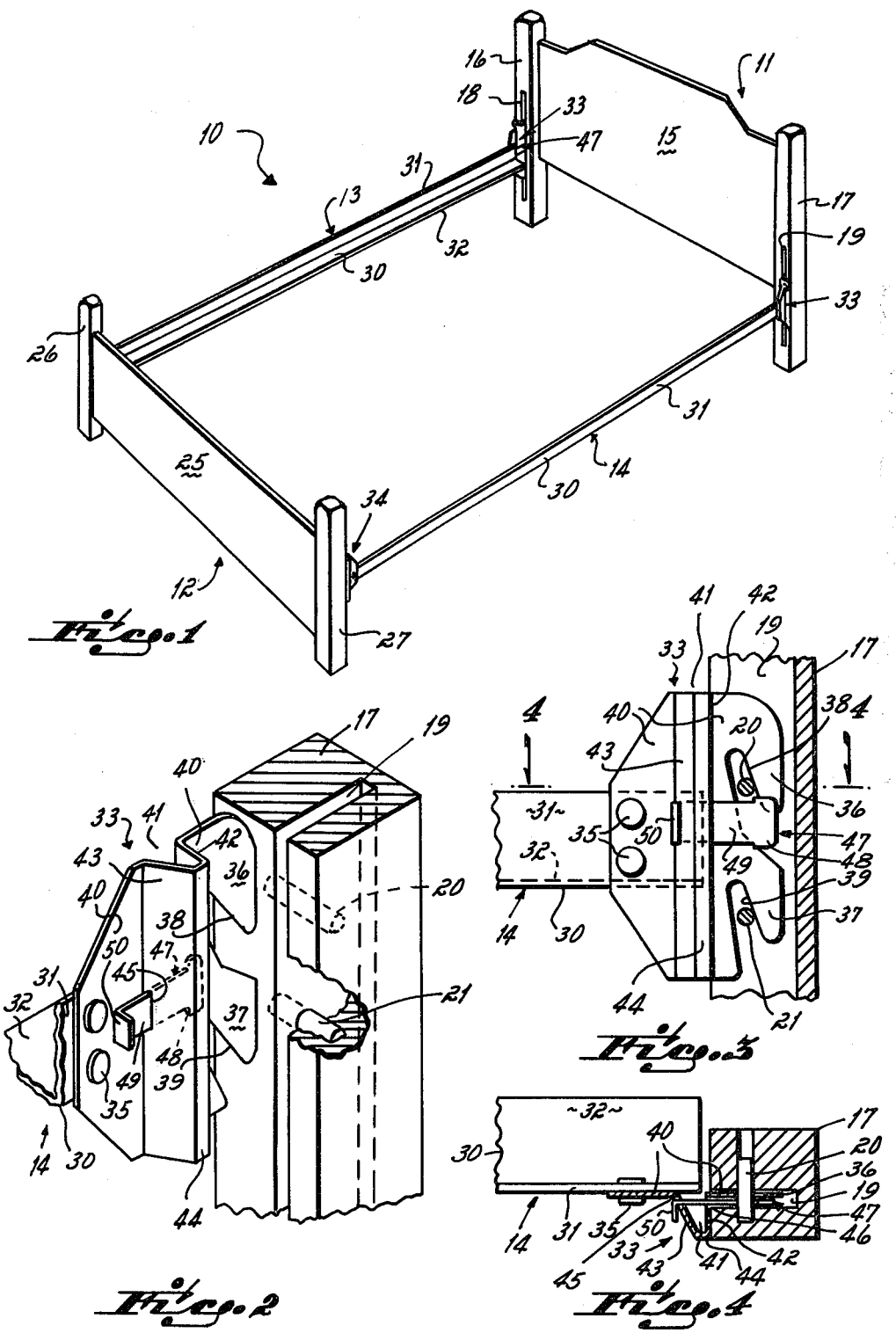

BED FRAME

This invention relates to bed frames and in particular bed frames of the type which include a headboard and footboard interconnected by side rails.

Traditionally, bed frames have been made from an assemblage of parts or elements which enabled the frame to be easily assembled and disassembled for movement from one location to another. Quite commonly that assemblage comprised a headboard, footboard and side rails so constructed that they could be assembled and disassembled without the need for any nuts and bolts or loose style connectors.

A common technique employed for interconnecting the headboard and footboard to the side rails has been to provide the ends of the side rails with a hook which fits into and over a pin located within a slot in the headboard or footboard. An example of such a hook, pin and slot connection between a side rail and a headboard of a bed frame is to be found in U.S. Pat. No. 2,947,999.

One problem encountered with bed frames of the type which may be easily assembled and disassembled without the use of nuts and bolts or small connectors, is that they are subject to inadvertent or accidental disengagement of the components of the assembly. In the event of such accidental disengagement, the bed frame falls apart and the mattress or bedding supported by the frame suddenly falls to the floor.

There have been several attempts to provide bed frames of this type with locks to prevent inadvertent or accidental disengagement of the side rails from the headboard or footboard. Examples of such locks are to be found in U.S. Pat. No. 460,034; U.S. Pat. No. 653,158; U.S. Pat. No. 792,326; and U.S. Pat. No. 1,518,970. Such locks though are subject to the criticism that they are relatively complex and add appreciably to the cost of the bed frame.

It has therefore been an objective of this invention to provide a bed frame of the type which is easily assembled and disassembled with a lock for securing the bed frame in an assembled condition.

Another objective of the invention has been to provide a bed frame of this type with an improved lock which is simple to use and does not add appreciably to the cost of the bed frame.

The bed frame of this invention which accomplishes these objectives comprises a headboard, a footboard and a pair of metal bed rails. The ends of the bed rails are provided with hooks insertable into slots of the headboard and footboard within which there are transverse pins over which the hooks are placed. A lock in the form of a locking tab is slideably mounted on each end of the rail. This locking tab is slideable longitudinally relative to the hook portion of the rails so as to locate the lock tab under a bedpost pin after the hook of the rail has been placed over the pin such that the hook and locking tab cooperate to lock the rail against movement relative to the pin. In the preferred embodiment, the ends of the bed rail have a bracket secured thereto, which bracket has the hooks formed on it and a vertical channel formed therein within which there is a spaced pair of slots. The locking tab is longitudinally slideable relative to the hooks within these slots.

The primary advantage of this invention is that it provides a relatively inexpensive metal bed rail with a lock for securing the bed rail to a headboard or footboard such that the rail cannot become accidentally disengaged from the headboard or footboard.

These and other objects and advantages of this invention will become more readily apparent from the description of the drawings in which:

FIG. 1 is a perspective view of a bed frame incorporating the invention of this application.

FIG. 2 is an exploded perspective view of a portion of the bed frame of FIG. 1.

FIG. 3 is a cross sectional view through a portion of the bed frame of FIG. 1.

FIG. 4 is a cross sectional view taken on line 4—4 of FIG. 3.

The bed frame 10 of this invention comprises a headboard 11, a footboard 12, and a pair of metal bed rails or side rails 13, 14. The side rails extend between and interconnect the headboard 11 to the footboard 12. Additionally, the side rails function as a support for bed slats (not shown) which extend between the side rails and upon which a conventional bedding foundation or box spring (not shown) is supported.

This bed frame 10 of this invention is intended to be assembled and disassembled without the need for any nuts and bolts or conventional loose connectors. As a consequence the frame may be quickly assembled or disassembled without the possibility of any loose, small parts becoming lost.

The headboard 11 comprises a wooden board 15 fixedly connected to a pair of wooden posts or legs 16, 17. The front edge of these posts has a vertical slot 18, 19 formed or machined therein within which one end of the rails 13, 14 is received. A pair of pins 20, 21 are mounted in the legs and extend transversely across the slots 18, 19. These pins are vertically spaced one from the other and, as explained more fully hereinafter, cooperate with hooks 36, 37 formed on the ends of the rails 13, 14 for securing the rails to the legs of the headboard.

The footboard 12 except for its appearance is substantially identical to the headboard. It comprises a transverse wooden board 25 fixedly connected to a pair of wooden posts or legs 26, 27. The legs 26, 27 are provided with slots (not shown) identical to the slots 18, 19 of the legs of the headboard. Additionally, the legs 26, 27 of the footboard are provided with pins (not shown) identical to the pins 20, 21 mounted in the legs 26, 27 of the headboard.

The side rails 13, 14 are identical and therefore only a single one, 14, will be described herein. It will be appreciated though that the other rail 13 is identical to that which is described in detail.

The side rail 14 comprises an L-shaped metal channel or rail 30 having a vertical section 31 and a horizontal section 32. The horizontal section of the rail is turned inwardly so that it functions as a support for transverse slats (not shown) supported between the rails.

Mounted on the ends of the section 31 there are metal brackets 33, 34 for securing the ends of the rail to the legs of the headboard and footboard respectively. Since the two brackets are identical, only a single bracket 33 has been illustrated and will be described in detail herein. It should be appreciated though that an identical bracket 34 is mounted on the opposite end of the rail, and additionally, that identical brackets are attached to the opposite ends of the other side rail 13.

The bracket 33 is secured to the vertical section 31 of the rail 30 by a pair of rivets 35. In general, the bracket extends longitudinally of the rail and has a pair of vertically spaced hooks 36, 37 formed on its outer end. A groove or recess 38, 39 slopes upwardly and inwardly from the outer end of the bracket between each of the hooks 36, 37 and the body or center section 40 of the bracket. As explained more fully hereinafter, the hooks 36, 37 are adapted to be received over the pins 20, 21 so as to locate the pins 20, 21 within the recesses 38, 39 and thereby interconnect the bracket to the leg 17 of the headboard.

The body or central section 40 of the bracket 33 has a vertically extending channel 41 formed therein. This channel is generally U-shaped in configuration and is defined by a pair of side legs 42, 43 and an interconnecting web or center section 44. A pair of slots 45, 46 are formed in the legs 42, 43 of the channel at the point at which the legs 42, 43 intersect the body or center section 40 of the bracket. These slots are horizontally spaced one from the other and receive a metal locking tab 47. This tab is generally T-shaped. It has a large head section 48 extending vertically from the center section 49. The inner end of the center section 49 of the tab 47 is bent at right angles to the center section 49 after insertion of the locking tab into the slots so that the tab cannot be withdrawn from the slots because of the interference of the bent end 50 with the leg 43 of the channel on one side and by the head 48 interfering with the leg 42 of the channel on the other side.

In use the bed rails 13, 14 are assembled to the headboard and footboard by insertion of the hooks 36, 37 of the end brackets into a slot 18, 19 of the legs of the headboard or footboard. The hooks are inserted above the pins 20, 21 and the rail is then pushed downwardly so as to force the pins 20, 21 into the sloping recesses or slots 38, 39. Thereby the bracket is seated within the slot. To insure that the bracket is never inadvertently dislodged from the leg 19, the locking tab 47 is then pushed outwardly from the position illustrated in FIG. 2 to the position illustrated in FIG. 3. In this latter position the head 48 of the locking tab cooperates with the lower end of the hook 36 to form an enclosure within the recess 38 wherein the pin 20 is locked. Thereafter, with the locking tab so positioned, upward movement of the rail relative to the leg is precluded and the rail cannot be inadvertently or accidentally dislodged from the leg.

When it is desired to disassemble the bed frame, the end 50 of the locking tab is grasped and pulled through the slots from the extended position illustrated in FIG. 3 to the withdrawn position illustrated in FIG. 2. In this latter position the locking tab no longer interferes with withdrawal or removal of the pin 20 from the recess 38 so that the rail 14 can then be lifted upwardly so as to move the hook 36 to a position in which its lower end is located above the pin 20. The end of the bracket 33 can then be withdrawn from the slot 19 so as to separate the end of the rail 14 from the headboard leg 17. Of course, this same procedure is repeated with respect to both ends of each rail so as to effect complete disassembly of the two rails and the headboard and footboard.

While I have described only a single preferred embodiment of my invention, persons skilled in this art will appreciate changes and modifications which may be made without departing from the spirit of my invention. Therefore, I do not intend to be limited except by the scope of the following appended claims.

I claim:

1. A bed frame comprising a headboard, a footboard, and a pair of bed rails, said headboard and said footboard both having a pair of vertical slots for the reception of ends of said bed rails, and at least one pin extending across each said vertical slots, each of said bed rails comprising a longitudinally extending rail having a vertical section at each end of the rail, a bracket fixedly secured to the vertical section of each end of said rails, each of said brackets having at least one hook formed thereon, said hook being located in a vertical plane with extends longitudinally of said rail, said hook being insertable into one of said vertical slots and over one of said pins contained within said slot, a latch mounted for longitudinal sliding movement on each of said brackets, each of said latches being movable between a withdrawn position and an extended position, said latch in said extended position being adapted to cooperate with a hook of the bracket upon which said latch is mounted so as to lock a pin within said hook so as to prevent said bed rail from being disassembled from said headboard or footboard without said latch first being moved into said withdrawn position, each of said brackets having an offset channel associated therewith, each of said channels extending in a vertical direction, and a pair of horizontally aligned slots extending through each channel of each of said brackets, said latches being slideably mounted in said slots.

2. The bed frame of claim 1 in which each of said brackets has two hooks formed thereon, both of said hooks being located in a vertical plane which extends longitudinally of said rail, said hooks being located one above the other on said bracket, and each of said hooks of each bracket being receivable over a pin within one of said slots.

3. The bed frame of claim 2 in which each of said channels of said brackets is generally U-shaped in configuration.

* * * * *